Oct. 16, 1956    F. R. BOKORNEY    2,767,337
BALANCING MACHINE PICK-UP
Filed May 11, 1953    2 Sheets-Sheet 1

INVENTOR.
Fred R. Bokorney
BY
Attorney

Oct. 16, 1956  F. R. BOKORNEY  2,767,337
BALANCING MACHINE PICK-UP
Filed May 11, 1953                            2 Sheets-Sheet 2
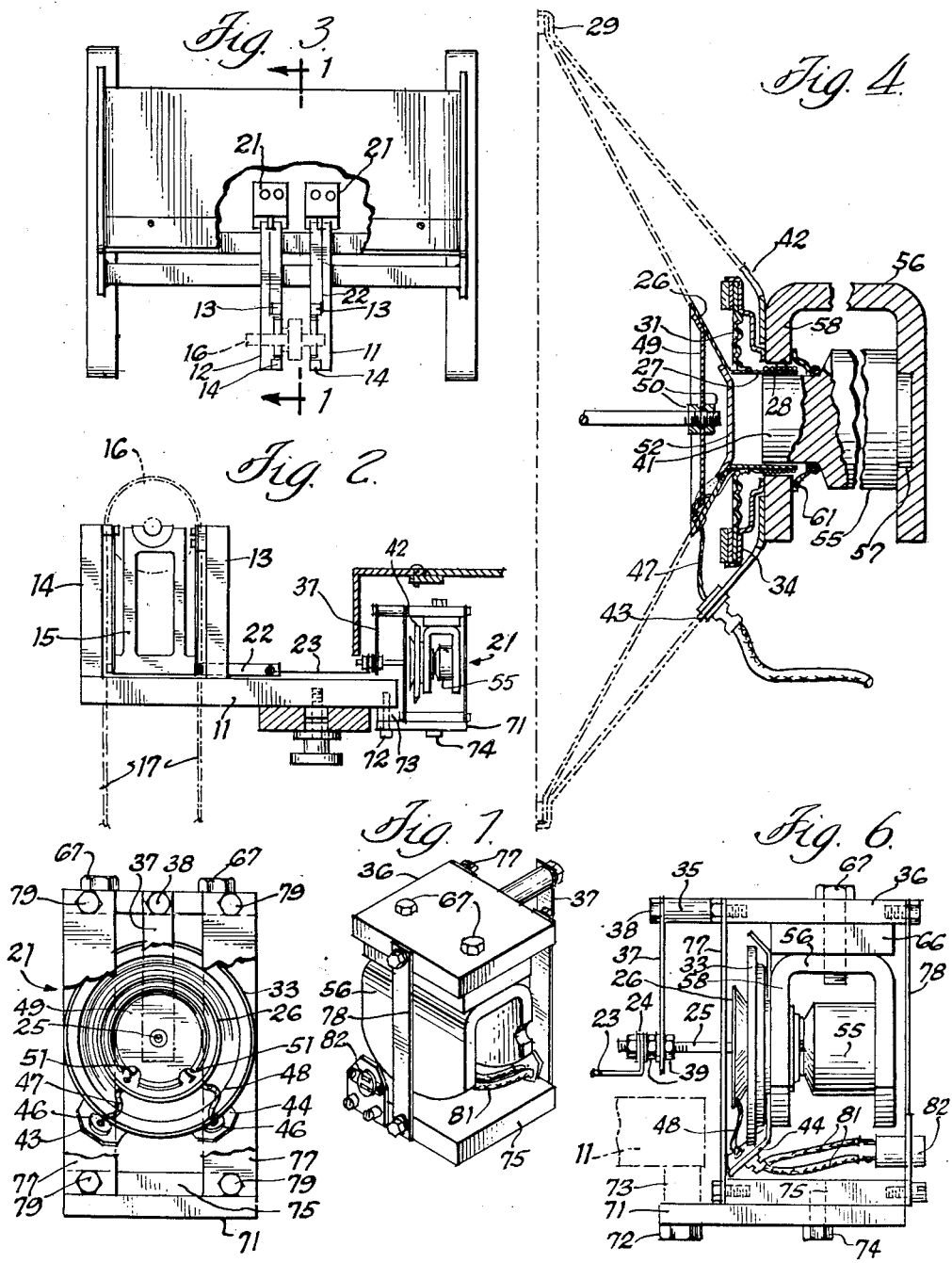
INVENTOR.
Fred R. Bokorney
BY
Attorney

United States Patent Office 2,767,337
Patented Oct. 16, 1956

2,767,337

BALANCING MACHINE PICK-UP

Fred R. Bokorney, Westchester, Ill.

Application May 11, 1953, Serial No. 354,072

4 Claims. (Cl. 310—25)

The present invention relates to improvements in balancing machines and concerns itself more particularly with novel structural features of as well as in improved methods of manufacturing magnetic pick-up devices therefor.

When testing rotor piece parts for dynamic or moment unbalance for the purpose of determining the location and magnitude thereof for guidance toward correction, it is customary to support the piece parts of floating journals or bearings which are held in cradles responsive to the induced vibrations. These vibrations in turn are communicated to an electric voltage generating device or devices which produce an undulating wave form that signifies by wave lobe amplitude the magnitude and angular location of a condition of unbalance or, more accurately speaking, of a resolution of such conditions.

The present invention concerns itself with an electrical apparatus that responds to the physical vibrations to generate an electric signal pattern in terms of voltage modulation whereby to produce a recordable replica of the unbalance conditions. With this signal pattern a recording may be made upon a volt meter, cathods ray tube, or other visual instrument from which the testing machine operator may be apprised of the precise angular location of the inertia unbalance. From this information may be calculated the amount of metal that requires to be applied or removed in order to achieve coincidence between the physical axial center and the mass center.

While moving coil types of alternating current generation have been employed before for this purpose, the inherent close tolerance conditions which are essential to such instruments for achieving faithful pattern reproduction, have imposed great manufacturing costs with the result that the costs of unbalance testing machines have been thereby correspondingly high. The problem here is one of diminishing the manufacturing cost of the pick-up apparatus by adapting or converting to this purpose certain mass produced loud speaker structures. In addition to operating efficiency, compactness of over all dimensions is highly desirable in order to make for facile operating conditions. The polarizing magnet is required to have substantial mass and yet to have a sufficient concentration so that the pick-up unit may be located as closely as possible to the journal supporting the cradles. For the purpose of preventing extraneous vibrations, the polarized magnet is advantageously mounted upon seismic supports whose pendulum length is more efficient when maintained relatively longer, but whose composite dimension on that account is made inordinately excessive so as to interfere with other utilitarian advantages, for example compactness, non-obstructiveness, etc. By the term seismic is meant a spring yieldable suspension or connection for preventing extraneous shock or vibration from impressing itself upon a relatively stable or inert component.

Accordingly, a principal object of the present invention is to devise a balancing machine pick-up apparatus which is more economical to manufacture and which possesses nevertheless a high degree of mechanical and electrical efficiency respecting faithfulness of signal pattern reproduction and compactness of over all dimensional characteristics.

Another object of the present invention is to devise an electromagnetic pick-up apparatus for balancing machines which may be produced by a process of reconversion of reclamation of electromagnetic loud speaker units which, because of their mass-produced economic efficiencies make available a high fidelity alternating current signal generation which would otherwise entail costlier, close tolerance, low production manufacturing methods.

Yet another object of the present invention is to teach a method of converting commercially assembled loud speaker units having cone supported voice coil alignment into a pick-up apparatus in which the voice coil support unit is effectively supplemented.

For a better understanding of the foregoing and other objects of this invention, attention is now directed to the following detailed specification having reference to the accompanying drawings, in both of which similar reference numerals designate corresponding parts throughout, and in which:

Fig. 2 is a fragmentary detailed sectional view through a cradle support and pick-up unit thereof;

Fig. 3 is a plan view of the apparatus on a reduced scale with portions broken away;

Fig. 4 is a transverse sectional view of a loud speaker unit illustrated on an enlarged scale, featuring the structural changes in converting it into a pick-up unit according to the present invention;

Fig. 5 is a front elevational view with portions broken away of a modified loud speaker unit converted into a pick-up apparatus;

Fig. 6 is a side elevational view of a modified pick-up unit; and

Fig. 7 is a diminutive perspective view observing the pick-up unit illustrated in Figs. 5 and 6 from a rearmost vantage.

Figure 1:
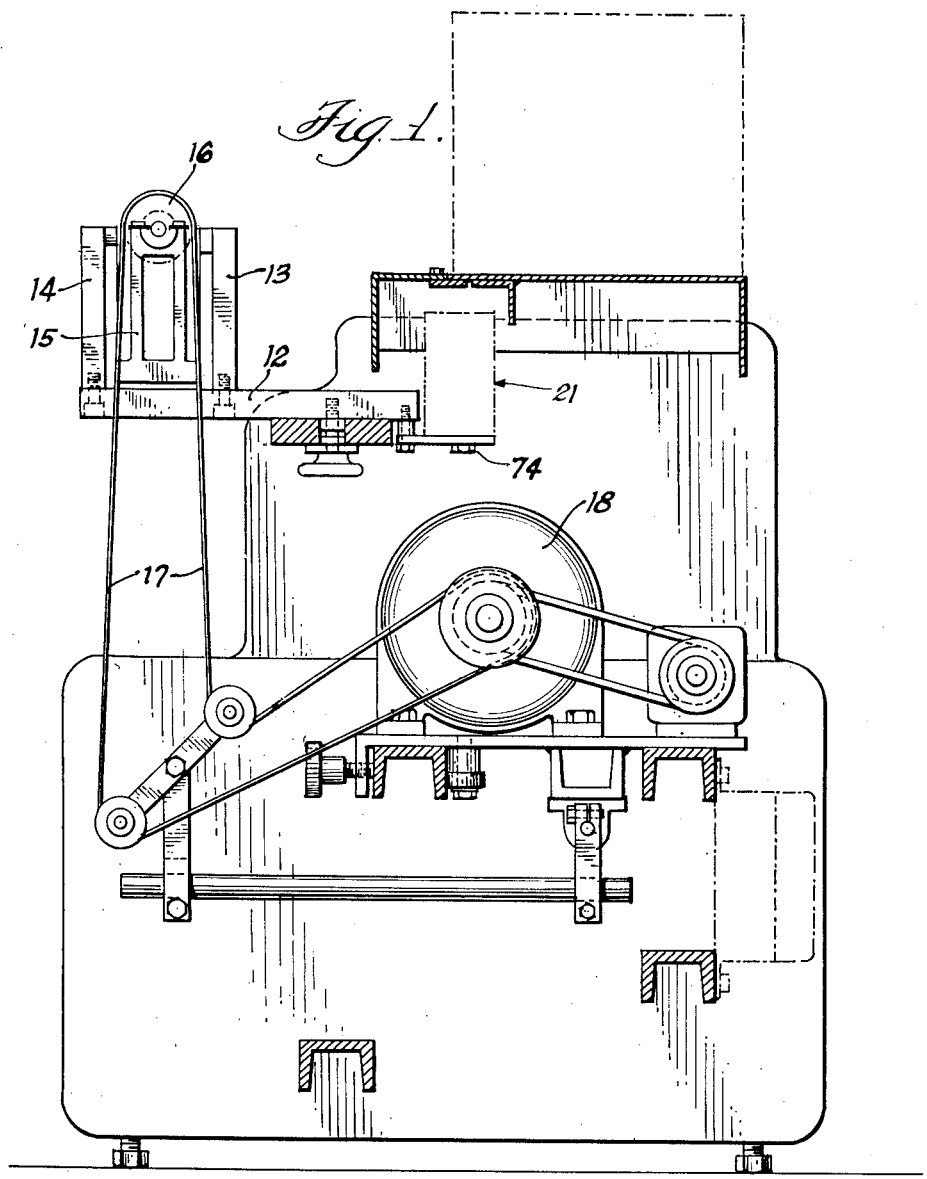
Fig. 1 is a transverse sectional sectional view taken approximately on line 1—1 of Fig. 3, of a balancing machine apparatus having embodied therein various features of the present invention.

In Figs. 1 and 3 of the accompanying drawings, the reference numerals 11 and 12 designate a pair of horizontally disposed cantilever beams which are provided at their projecting ends with upstanding support posts 13 and 14 from which are pendulously suspended the so-called bearing mount cradles 15 on which the work piece 16 is journalled while under test. In the co-pending application, Serial No. 346,766, filed Apr. 3, 1953, the features and operation of these components are more explicitly described.

In accordance with the featured suspension of the cradles 15, they are uniquely constrained to respond in a horizontal direction only to the rotary throb or vibration which is generated when the work piece 16 is rotationally driven by its power transmitting belt 17 driven by an electric motor 18.

Out-of-balance conditions in a work piece which possesses appreciable axial length will accordingly manifest themselves in each of the two cradle elements 15 in an independent manner. That is to say, the periodicity or instant of occurrence of a resolution of out-of-balance conditions in terms of a rotary cycle may produce a displacement in one of the cradles 15 during an instant different from that produced by the resolution of such out-of-balance conditions of the other cradle 15 respecting the same cycle.

The degree or magnitude of the vibrational displacement is likewise independent respecting the one cradle element 15 in comparison with that of the other cradle element. From these two fundamental characteristics respecting the quantities of unbalance, there may be determined independently of one another the amount of correction which is required to be made at each end of the rotor or work piece in order to achieve a balanced condition. Alternatively, the two independent characteristic determinations may be combined and from their summation a single corrective determination may be deduced.

The electric pick-up devices generally designated 21 constitute apparatus chosen to interpret the magnitude and periodicity characteristics aforedescribed by translating the generated unbalance vibrations into alternating current signal patterns which are subsequently utilized to effect a stroboscopic triggering control as well as to impress a visual recording upon a suitable electric reading instrument.

Since the unbalance gyrations of a work piece under test are physically restrained to horizontal movement by the characteristic design of the cradle supporting fixtures, each resolution of unbalance conditions of a linear type of work piece supported upon the beams 11 and 12 will cause its related cradle member 15 to respond in a corresponding horizontal movement. At their lower extremities the cradle elements 15 are equipped with rearwardly jutting bars or links 22, Fig. 2, which project the vibrational rhythm to slender wire elements 23 which have looped extremities 24, Fig. 6, for the reception therewithin of the horizontally projecting stems 25 that constitute initial communication elements of the pick-up units 21.

All of the aforedescribed series of motion transmitting elements including links 22, wire rods 23, and stems 25, are comparatively stiff and comparatively inflexible members so that the aforedescribed horizontal vibrations are transmitted substantially undamped to the speaker cone assembly which comprises the apex fragment of the cone proper 26 and its coil winding support form 27, Fig. 4.

In order to stabilize and confine its movement to a direction paralleling the axial center of the assembly, the voltage generating coil 28, together with its supporting cylinder or coil form 27, are cemented to the apex of the cone. In the speaker unit which utilizes a full skirt cone section, the perimeter is secured to the flange ring 29 by clamping or cementing at an intermediate level to a plasticized diaphram 31, as at 32. The surface of the diaphram 31 is advantageously fluted with concentric sinuous rings and its outermost periphery is anchored within a circumferential skirting ring 33, Figs. 5 and 6, of a diaphram supporting disc 34, Fig. 4.

To supplant the stabilization and support originally provided in the loud speaker cone element by the skirting flange 29, a sidewardly extending post 35 is mounted to the top end block element 36 and from its end there depends a flexible leaf spring 37, the upper end of which is bolted as at 38, the lower end of which has an aperture for receiving the shaft stem 25 after the manner best indicated in Fig. 6, being secured between a pair of lock nuts 39.

Between the buoyant suspension which is afforded by the plasticized fabric diaphragm 31 and the directionalized suspension or seismic mount of leaf spring 37, stem 25 together with its carried elements, including cone segment 26 and coil 28, are maintained in parallel alignment yieldable solely to a horizontal movement with the A.-C. generating coil 28 in concentric alignment with its cylindrical pole piece 41. Thus, as the piece part vibrations are transmitted through the aforedescribed linkage to the stem 25, the lightness in weight of all of the component parts which are identified with the generating coil 28 serves to assure faithful and instantaneous responses substantially undamped so that the resulting generated signal curve pattern may constitute an accurate portrayal of the unbalanced characteristics.

In the conversion of the illustrated type of production line loud speaker unit, a major part of the cone element together with its bracing ring fixture which includes flange 29, are cut away in the manner best illustrated in Fig. 4. This is accomplished by circumcising the fibrous material of which the speaker cone itself is made and by cutting down the spider arms which extend from the collar flange 42 and are originally integral with the peripheral flange 29. In the case of the lowermost spider arms, it is of advantage to retain stub segments as at 43 and 44, Fig. 5, that may be utilized subsequently as terminal post supports by being perforated and thereat provided with rubber grommets 46. Through these grommets there are trained the terminal lead wires 47 and 48 connected to the generating coil 28.

In order to provide a durable means for anchoring stem 25 to the cone fragment 26, a dished aluminum wafer 49 having the terminal lead cut-out clearances 51, Fig. 5, is cemented to the inner surface of the cone and to this element there is secured the innermost end of the stem 25 by fore and aft pairs of lock nuts as at 51. As the end of the shaft 25 is thus placed and secured together with the aluminum wafer 49, it causes a slight depression in and beds itself against a felt disc 52 usually glued to the inner surface of the apex, contributing thereby to the prevention of transverse vibrational or drum effects from becoming generated by the wafer element 49.

An adequate signal pattern has been reproduced by the utilization of a cobalt magnet or Alnico core 55 together with a horse-shoe shaped magnetic bridge 56 in which the rear end of the core is permanently anchored as at 57. At the air gap region between it and the other leg 58, the cobalt magnet core is turned down to a cylindrical nose projection 41 already described, while the horse-shoe leg 58 is thereat cylindrically apertured. In keeping with mass production methods an aligning collar 61 of non-magnetic material may be secured to the inner face of leg 58 for guiding reduced collar portion 62 thereof. The placement of a spacer ring 63 between the collar 61 and the shoulder of magnetic core element 55 after the assembly has been made, serves to constrain the elements in their proper relationship.

The intermediate portion of the horse-shoe magnet bridge is advantageously flattened and the flattened portion is bored so that this sub-assembly may be secured against a pillow block 66 and the two members secured to the end block 36 by means of cap screws 67. In order to prevent external vibrations or environmental tremors from being transmitted to the polarizing magnet such as would tend to superimpose distortion upon the resulting signal pattern, the aforedescribed unit is seismically mounted on a base assembly comprising the plateform block 71 bolted as by the use of cap screws 72 and offsetting sleeves 73 to the under surface of the innermost extremities of the beams 11 and 12.

The platform blocks 71 are bolted as by the use of cap screws 74 to a lowermost end block 75 correspondingly dimensioned to the already described uppermost end blocks 36. Steel or other suitable and flexible metallic strips of which there are a pair 77 on one side, Fig. 5, and a single strip 78 on the opposite side, are bolted to the opposing end blocks 36 and 75 by means of horizontally applied cap screws 79. The inertia effect of the polarizing magnet and its seismic mounting accessories thus prevent vibrational tremors from being transmitted to the unit in a direction which would be deleterious to the preservation of the signal pattern.

The generated alternating current produced by the voice coil of the speaker 28 is extended over the lead terminals 47 and 48 to the secondary lead wires 81 to a connector plug receptacle 82 into which may be inserted one or more of the triggering or recording devices which the signal pattern is intended to impress.

In the foregoing disclosure there has been described an unique type of electromagnetic pick-up device together with its process of manufacture which contemplates utilizing by reconversion known and commerically mass produced loud speaker units in which the voice coil and loud speaker cone are utilized as an alternating current signal generating device. Through this practice there has been achieved the equivalent fidelity of a magnetic pick-up apparatus several times costlier to manufacture under hand-tool methods of production. Through this synthesis and reconversion the resulting costs of a balancing machine apparatus is materially lowered without sacrificing quality, and thereby making piece part testing available to a wider range of potential users as where marginal costs considerations are controlling.

While the present invention has been explained and described with reference to a specifically contemplated structural design and method of manufacture, it will be understood nevertheless that various changes and modifications are susceptible of being incorporated within its essential scope. For latitude of interpretation therefore, reference is had to the hereinafter appended claims.

The invention claimed is:

1. In a balancing machine pick-up unit, a polarizing magnet comprising a cyclindrical core portion and a flux path continuation portion of rectangular horseshoe conformation, said core portion including a reduced diameter projection extending into a cylindrical bore in one of the legs of said horseshoe portion, an alternating current generating coil between said reduced diameter projection and said cylindrical bore, and means for constraining said coil to movement coaxial with said projection which comprises a cup element having a flanged periphery secured to the outer surface of one of said horseshoe magnet legs, a speaker cone apex carried by said coil, a stabilizing diaphgram held in the flange exteremity of said cup flange element and encircling said cone apex, a wafer forming a base intersection to said cone apex, a stem shaft having one end secured to said wafer, and a rigidly anchored flat spring element supporting the other end of said stem shaft seismically against lateral vibrations.

2. A method of converting a magnetic loud speaker unit which includes a polarizing magnet and a cone mounted voice coil, into a balancing machine pick-up unit which comprises the steps of cutting away the speaker cone circumferentially to a residual conical apex, cementing a circular reinforcing diaphram peripherally to the base of the apex, securing an actuator stem to the center of the diaphram, and mounting the polarizing magnet upon a series of vertically extending seismic spring elements.

3. The method set forth in claim 2 including the further step of mounting a pendular spring support element to the actuator stem for the purpose of assisting in the preservation of its coaxial alignment.

4. A method of converting a magnetic loud speaker unit in which there is provided a horseshoe polarizing magnet having a transverse pole core and a speaker cone supported voice coil into a balancing machine pick-up device which comprises the steps of cutting away the speaker cone peripherally to a residual apex section, cementing a circular diaphram across to form the base of the apex, securing an actuator stem to the center of the diaphram, and suspending the polarizing magnet with its horseshoe legs downward from a series of vertically extending seismic spring elements, so that external vibrations are excluded from the direction of movement parallel to that of the voice coil.

References Cited in the file of this patent

UNITED STATES PATENTS

| | | |
|---|---|---|
| 1,855,168 | Farrand | Apr. 19, 1932 |
| 2,002,372 | Greentree | May 21, 1935 |
| 2,034,787 | Williams | Mar. 24, 1936 |
| 2,067,803 | Thearle | Jan. 12, 1937 |
| 2,082,646 | Mead | June 1, 1937 |
| 2,129,628 | Serge | Sept. 6, 1938 |
| 2,145,711 | Critchfield | Jan. 21, 1939 |
| 2,355,194 | Wiggins | Aug. 8, 1944 |